April 22, 1941. M. F. PETERS ET AL Re. 21,782

INTERNAL COMBUSTION ENGINE IGNITION

Original Filed Sept. 22, 1936 2 Sheets-Sheet 1

INVENTOR.
MELVILLE F. PETERS
R. HARRY STONE

BY

ATTORNEY.

April 22, 1941. M. F. PETERS ET AL Re. 21,782

INTERNAL COMBUSTION ENGINE IGNITION

Original Filed Sept. 22, 1936 2 Sheets-Sheet 2

INVENTOR.
MELVILLE F. PETERS
R. HARRY STONE

BY Robert A. Farnsworth
ATTORNEY.

Reissued Apr. 22, 1941 Re. 21,782

UNITED STATES PATENT OFFICE 21,782

INTERNAL COMBUSTION ENGINE IGNITION

Melville F. Peters, Beltsville, Md., and R. Harry Stone, Bound Brook, N. J., assignors to Titeflex Metal Hose Co., a corporation of New Jersey Original No. 2,173,539, dated September 19, 1939, Serial No. 102,020, September 22, 1936. Application for reissue September 18, 1940, Serial No. 357,332

17 Claims. (Cl. 123—148)

This invention has special reference to the insulation, radio shielding and protection of the ignition conductors of internal combustion engines, but is capable, especially as to some of its features, of a large number of widely different applications.

One object of the invention is to provide improved radio shielded and insulated ignition conductors for an internal combustion engine.

A further object of the invention is to provide an electric conduit with a conductor therein, and spaced therefrom by solid, segmental, insulating means.

A further object of the invention is to provide a conduit and a conductor therein having a plastic insulating and dielectric compound within the conduit and about the conductor.

A further object of the invention is to provide a flexible conduit having a conductor therein with solid, segmental, insulating means spacing the conductor from the conduit and a plastic insulating and dielectric compound within said conduit and about said conductor and insulating means.

A further object of the invention is to provide an improved new and useful composition of matter.

A further object of the invention is to provide a plastic insulating and dielectric compound.

Other and ancillary objects of the invention will appear hereinafter.

In the accompanying drawings which illustrate the invention—

Figure 1:
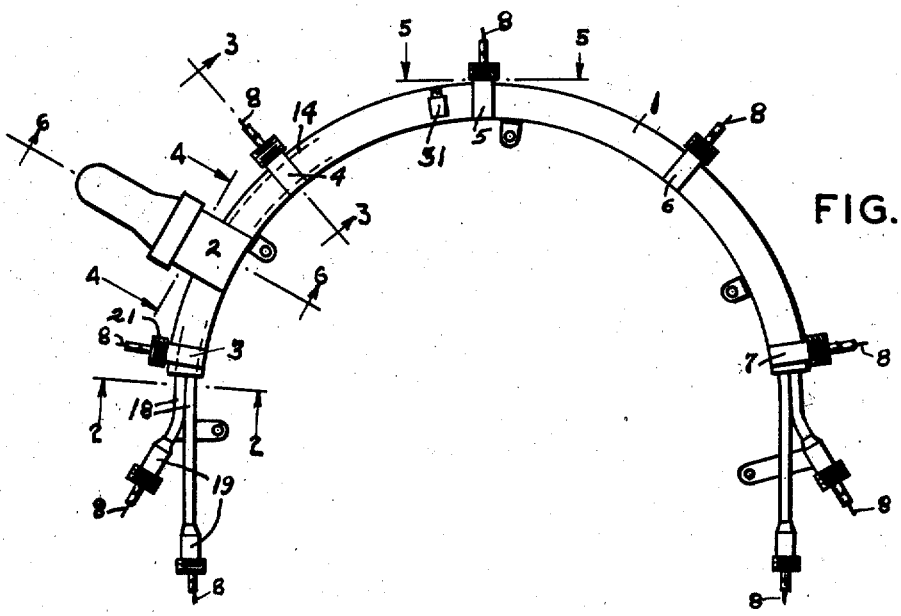
Fig. 1 is a side elevation of an ignition manifold.

Referring to Figs. 1 to 9 of the drawings, the apparatus there shown is intended for use with an ignition system for internal combustion engines wherein leads extend from the spark plugs to a so-called "manifold" whereby the ignition conductors are guided about the shaft of the engine and conductors lead from the manifold to a magneto whereby the electricity for the ignition is conducted from the magneto to the various spark plugs through timing and distributing devices as are well understood in connection with internal combustion engine ignition.

The leads are further provided with metal covering which operates as a shield to prevent interference by the ignition current with radio apparatus in the neighborhood especially when the engine and radio apparatus are mounted in such close proximity as is necessary with the limited space available in an aeroplane.

In the structure of Figs. 1 to 9, inclusive, the manifold comprises a metal casing 1, having the inlet 2 for the conductors from the magneto and outlets 3, 4, 5, 6 and 7 for the conductors leading to the spark plugs. At other points than the inlet and outlets the manifold casing is rectangular with rounded corners, as shown in Figs. 2 and 11 to 13, or it may be round or polygonal or of other suitable shape, the inlets and outlets referred to being offset as clearly appears from Figs. 3, 4, 5, and 6.

The conductors 8 from the magneto (see Fig. 6) are individually insulated each being covered with the insulation 9, or the conductors might be mounted and insulated as hereinafter described in connection with the manifold or they might have segmental insulators or beads threaded on them and the spaces filled with a plastic insulating compound as hereinafter referred to. These insulated conductors are included within a metal conduit 10 connecting with the radio shield or metal casing about the magneto and having an end secured in the metal plate 11 secured to the metal casing 12 of the inlet 2 by means of a screw collar 13.

The conductors 8 extend within the inlet and through the manifold to the spark plugs. Within the manifold the conductors 8, which may be bare of insulation, are supported in position by means of an arc-shaped member 14 of molded Bakelite or other suitable insulating material which is pushed inwardly endwise, or is telescoped, within the manifold casing 1 and extends from one end to the other of the manifold.

In the member 14 of Bakelite or other suitable insulating material are longitudinal slots 15 in which the conductors 8 are laid and are secured therein by filling strips or wedges of insulation 16 within the slots which not only serve to hold the conductors in place in the slots but also act as spacers to space the insulating support 14 and its carried conductors from the metal casing 1. The conductors 8 within the casing may be bare but preferably are coated with enamel insulating material.

Each end of the manifold 1 is closed by a tight cap 17 secured in the end of the manifold and through the cap metal pipes or conduits 18 communicate with the interior of the manifold casing, these tubes each carrying one of the conductors 8 and terminating in a screw coupling 19, comprising the metal casing 22 enclosing the insulation 23 to which the spark plug lead, preferably flexible, is connected.

Within each of the tubes 18 the conductors 8 are insulated by and prevented from coming against the tubes 18 by means of insulating beads 20 of suitable insulating material such as molded Bakelite.

It will be seen that each of the outlets 3 to 7, inclusive, terminates in a screw fitting or nipple 21 for the attachment of a conduit for the conductor proceeding to its respective spark plug.

Each spark plug lead (see Fig. 9) comprises the conduit including the flexible metal tube 24 which may be a corrugated flexible tube of the construction as shown in the patent to Louis H. Brinkman, No. 1,198,392, patented September 12, 1916, which may or may not be encased in a braid 24' consisting of interwoven flat metal strips as shown, for instance, in Fig. 5 of the patent to Louis H. Brinkman, No. 1,340,818, patented May 18, 1920.

At one end the conduit is provided with a swivel nut 25 which may engage with a nipple 21 or a screw coupling 19 to secure the conduit to the manifold and the other end of the conduit is secured to a metal casing 26 having a suitable molded insulating material 27, providing a means for attaching the conductor to the spark plug terminal and also means for attaching the casing to the spark plug shield.

Passing through the Bakelite 27 is a metal tube 28 forming a conduit for the ignition conductor, and secured to the casing 26 is a swivel nut 29 by which the elbow may be secured to a nipple on the metal casing for radio shielding the spark plug. The ignition conductor 8 passes through the tube 24, the tube 28 and is placed in electrical connection with the central contact of the spark plug in any suitable or well-known manner.

Figure 2:
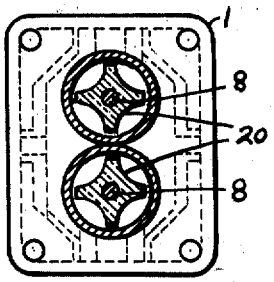
Fig. 2 is a section on the line 2—2 of Fig. 1 on an enlarged scale.
Figure 4:
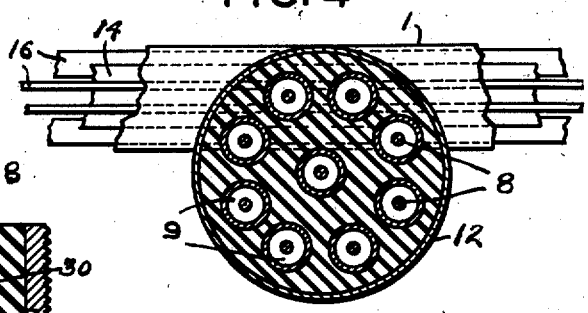
Fig. 4 is a section, with the parts partly broken away, on the line 4—4 of Fig. 1 on an enlarged scale.
Figure 3:
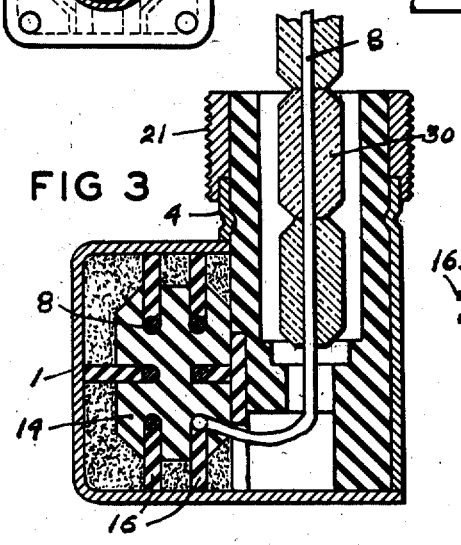
Fig. 3 is a section on the line 3—3 of Fig. 1 to the same scale as Fig. 2.
Figure 5:
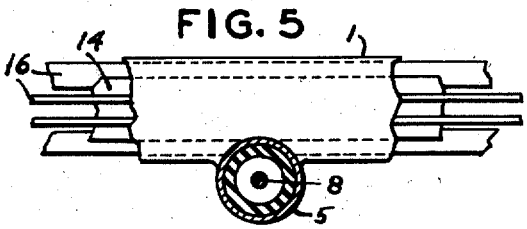
Fig. 5 is a section, with the parts partly broken away, on the line 5—5 of Fig. 1 on the same scale as Fig. 4.
Figure 6:
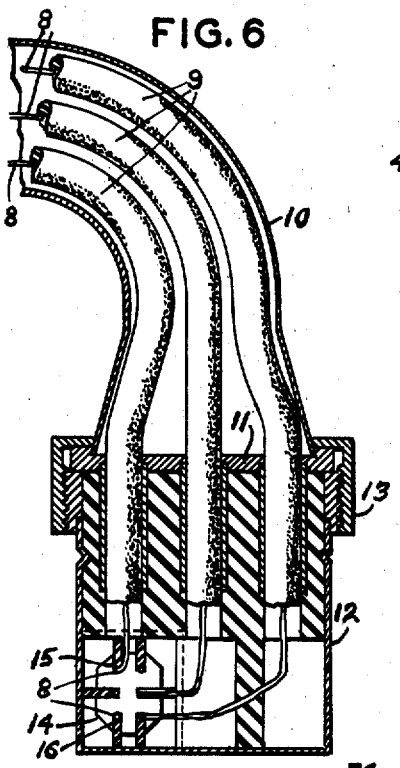
Fig. 6 is a section, with the parts partly broken away, on the line 6—6 of Fig. 1 on the same scale as Fig. 4.

The conductor 8 is threaded through the beads 30 of Bakelite or other insulating material, such beads being cruciform in cross sections as shown in Fig. 2 and there is a clearance between the beads and the inside of the tube 24 so that the movement of the beads will be accommodated to permit flexing of the conduit and the ignition conductor; also there is sufficient clearance between the beads and between them and the conductor 8 to permit the conductor and the lead to flex as desired. The conductor itself may be solid or, to provide more flexibility, it may be stranded.

It will thus be seen that the ignition leads are flexible so that they are adaptable to the various circumstances of connecting with the spark plugs.

In order to improve the insulation of the conductors and also to provide the desired dielectric properties, the space about the conductors and the supports 14 and 16 therefor within the manifold, as well as the spaces about the conductors and the beads 30 in the flexible conduits of the spark plug leads, and also the spaces about the conductors where the spark plug leads and manifold join, are filled with a compound possessing the desired qualities of insulation and as a dielectric.

This compound should, especially in the spark plug leads, be plastic so as to permit flexing of the leads, and this quality of plasticity is also desirable in the compound within the manifold as it permits the compound to be readily inserted into position, entering every crevice, and permits the ready withdrawal of the conductors and supports from the manifold. Also, the plastic compound prevents damage to the conductors or their solid insulation support by cushioning shocks or blows upon the exterior of the conduit casing.

The compound must, of course, retain suitable plasticity under the temperatures in which it is normally used. A plastic compound having the desired insulating and dielectric properties, and whose plasticity is unaffected by heat over a wide range of temperatures may be formed from heavy-bodied or polymerized oils, with which may be mixed other ingredients contributing to the desired qualities.

Among the oils suitable for this purpose may be mentioned castor oil, China-wood oil, and linseed oil. Such polymerized or heavy-bodied oils will not carbonize at relatively high temperatures, and are, therefore, suitable for use in locations where the temperatures run high as, for instance, in the ignition conductors associated with internal combustion engines where the temperature often reaches a high value.

With the oil as described may be mixed silicates having suitable insulating or other qualities, among which are mica, asbestos, silicon oxide, etc. These materials would, of course, be comminuted or ground so as not to interfere with the plasticity of the oil and to permit of the thorough mixing therewith.

The oil or the mixture of oil and silicates may have rubber incorporated therewith for the purpose of improving the insulating and other properties.

The proportions of the ingredients may be widely varied and some ingredients may even be omitted under some circumstances but as a concrete illustration a plastic compound which has been found satisfactory under many conditions is formed by mixing ⅓ mica, ⅓ castor oil which has been previously heated until the castor oil polymerized, and ⅓ rubber. The presence of rubber improves the electrical and mechanical properties. The rubber, however, decreases the heat resisting properties of the compound. It may be permissible, therefore, to add the rubber where the temperature to which the compound is to be subjected will permit it, the amount of rubber which may be added depending upon such temperature. Where the temperatures are relatively high, the rubber may be entirely omitted; the composition then being ⅔ polymerized castor oil and ⅓ mica, the rubber where added displacing a proportionate amount of the polymerized oil.

The rubber may be ground and mixed with the castor oil and insulating material, such as mica, etc., and then the mixture heated until the oil polymerizes. The ground rubber may also be mixed with the castor oil after the last has been polymerized and the mixture then heated. Also the rubber may be liquefied or dissolved in the hot polymerized oil and the mixture then mixed, while hot, with the comminuted mica.

In making use of the plastic compound in connection with the ignition conductors, casings, and conduits, as above referred to, the manifold is provided with an inlet nipple 31 having a check valve preventing the exit of the compound after it has been forced in, to which may be applied an instrument similar to an air pump or grease gun for forcing in the compound. The plastic insulating and dielectric composition as referred to may thus be forced into the manifold spaces about the conductors and supports, also passing through the openings from the manifold into the spark plug leads, whereby the spaces in such leads about the conductors and insulating beads thereon will be filled with the composition.

The wedges or strips 15 are divided into longitudinally distributed sections with clearances between the sections so that the compound can readily percolate to all spaces within the manifold.

To facilitate the filling of the ignition leads with the compound, openings 32 and 33 (see Fig. 9) of the leads will be provided in the couplings at the ends of the leads, through which the compound may be forced in at each end of the lead.

The opening 32 is controlled by a ring 34, rotatable upon the coupling and having a hold adapted to be moved into and out of registry with the hole 32. When in such registry communication is afforded with the interior by which the compound may be forced into the lead by any suitable means, and after such operation has been completed the opening may be closed by rotating the ring 34 until the hole in it is out of registry with the hole 32 in the coupling, and thus communication with the exterior is shut off.

Similarly, the opening 33 is controlled by a rotatable ring 35 having a hold 36 adapted to be moved into and out of registry with the hole 33 as the ring is rotated.

In applying the plastic composition to the apparatus described, the apparatus is first thoroughly dried, the openings 32 and 33 in each of the leads being open, so as to remove all traces of moisture, the apparatus being heated to about 100° F. The apparatus is then placed in a vacuum tank or container with the vent openings in the leads still open, which will operate to exhaust all air from the interior of the manifold and conduits so that the plastic composition when forced in under pressure will enter all spaces therein and the formation of bubbles will be avoided. While in this condition the composition is forced under pressure into the manifold and spark plug lead conduits, entirely and completely filling the same and a solid, compact mass is secured throughout.

In order to avoid possible corrosive action of the compound on the conduits containing it, they should be constructed so as to present non-corrosive surfaces to the compound. This may be accomplished by "tinning" their interiors, that is coating them with tin or in other suitable ways. In the case of the strip formed tube 24, the tube might be formed from a tin or other suitably plated strip.

It will be observed that the conductors are entirely enclosed in metal, radio shielding casings or conduits whereby interference with neighboring radio apparatus by the ignition currents in the conductors is avoided.

Figure 10:
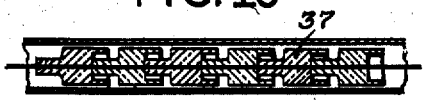
Fig. 10 is a fragmentary section of a lead having a modified form of segmental insulating and supporting means for the conductor in the conduit.

In Fig. 10 is shown a modified construction wherein the beads 37 consist of cylinders telescoping with each other to a greater or lesser extent, and with suitable clearances to permit flexing, instead of the form of beads 30 as previously referred to.

Figure 11:
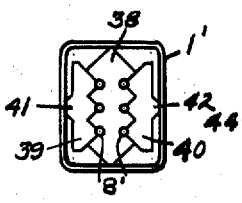
Figs. 11, 12, and 13 are cross sectional views of the manifold showing modified forms of the solid insulating support for the conductors.

In Fig. 11 is shown a modified form of insulating support for the conductors within the manifold. In this structure as illustrated in Fig. 11, the molded insulating support of Bakelite or other suitable insulating material, within the metal casing 1' of the manifold consists of the central section 38, having grooves within which the conductors 8' are located and having its pointed ends bearing against the manifold casing 1'. At the sides of the section 38 are the sections 39 and 40, which are similar to each other and have projections entering the grooves in the section 38 and hold the conductors in place, the sections 39 and 40 respectively having the projections 41 and 42 bearing against the casing 1' so that the conductors are securely insulated and firmly held in position.

Figure 12:
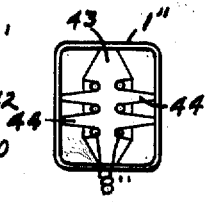

In the modification shown in Fig. 12, the molded Bakelite support 43 for the conductors 8'' within the manifold metal casing 1'', as will be seen from the figure, comprises a central portion having its ends bearing against the casing 1'' and lateral projections 44 bearing against the casing, the whole being arranged to provide grooves within which the conductors 8'' are located.

Figure 13:
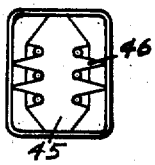
Figure 9:
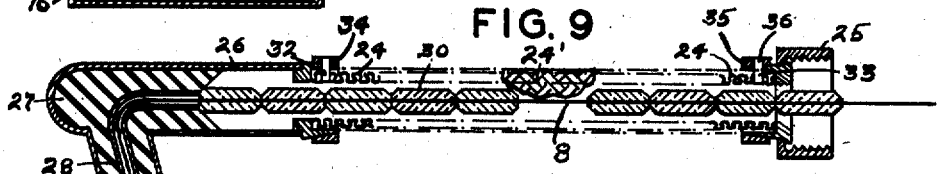
Fig. 9 is a view, partly broken away and partly in section, to the same scale as Figs. 7 and 8, of a spark plug lead.
Figure 9:
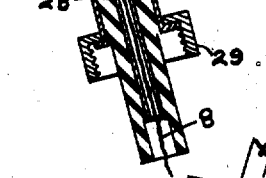
Figure 8:
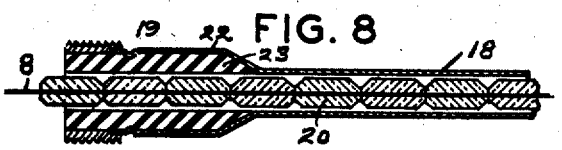
Fig. 8 is a sectional view, on the same scale as Fig. 7, of the end to which the ignition lead is secured, of a tube extending from the end of the manifold.
Figure 7:
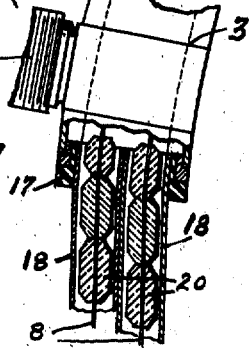
Fig. 7 is a fragmentary view of an end of the manifold broken away to show in section the construction thereof.

In the modification shown in Fig. 13, the construction is similar to that of Fig. 12 except that the central portion 45 of the Bakelite support for the conductors is broader and the lateral projections 46 are shorter, but otherwise the structure is similar to that shown in Fig. 12.

While the invention has been illustrated in what are considered its best applications, it may have other embodiments without departing from its spirit, and is not, therefore, limited to the structure shown in the drawings.

What we claim is:

1. In a radio-shielded ignition system, the combination with a radio-shielding manifold of radio-shielding spark plug leads extending therefrom, conductors in said manifold and leads, said manifold being arc-shaped, and a relatively rigid arc-shaped insulating support for the conductors within the manifold, the longitudinal axis of said support being curved in substantial accordance with the longitudinal curvature of said manifold.

2. In a radio-shielded ignition system, the combination with a radio-shielding manifold of radio-shielding spark plug leads extending therefrom, conductors in said manifold and leads, said manifold being arc-shaped, and a relatively rigid arc-shaped insulating support for the conductors within the manifold, the longitudinal axis of said support being curved and substantially conforming to the longitudinal curvature of said manifold and a plastic insulating and dielectric compound about said conductors within the manifold.

3. In a radio-shielded ignition system, the combination with a radio-shielding manifold of radio-shielding spark plug leads extending therefrom, conductors in said manifold and leads, said manifold being arc-shaped, and a relatively rigid arc-shaped insulating support for the conductors within the manifold, the longitudinal axis of said support being curved and substantially conforming to the longitudinal curvature of said manifold and a plastic insulating and dielectric compound about said conductors within said manifold and leads.

4. In a radio-shielded ignition system, the combination with a radio-shielding manifold of radio-shielding spark plug leads extending therefrom, conductors in said manifold and leads, said manifold being arc-shaped, and a relatively rigid arc-shaped insulating support for the conductors within the manifold, the longitudinal axis of said support being curved and substantially conforming to the longitudinal curvature of said manifold and a plastic insulating and dielectric compound about said conductors within said leads.

5. In a radio-shielded ignition system, the combination with a radio-shielding manifold of flexible radio-shielding spark plug leads extending therefrom, flexible conductors in said leads and flexure permitting, segmented, solid insulating means about the conductors in said leads.

6. In a radio-shielded ignition system, the combination with a radio-shielding manifold of flexible radio-shielding spark plug leads extending therefrom, flexible conductors in said leads and flexure permitting, segmented, solid insulating means about the conductors in said leads, and a plastic insulating and dielectric compound about said conductors and insulating means in said leads.

7. In a radio-shielded ignition system, the combination with a radio-shielding manifold of radio-shielding spark plug leads extending therefrom, conductors in said manifold and leads, a relatively rigid insulating support for the conductors within the manifold, and a plastic insulating and dielectric compound about said conductors within said leads.

8. As a new article of manufacture, a radio-shielding spark plug lead for a radio-shielded ignition manifold of the class described, said spark-plug lead comprising at least one conductor, a plastic insulating and dielectric compound about said conductor, a relatively flexible metal radio-shielding enclosing said plastic compound and flexure-permitting segmented, solid insulating means upon said conductor and embedded in said plastic medium.

9. In a radio-shielded ignition system, the combination with a radio-shielding manifold, of radio-shielding spark plug leads extending therefrom, conductors in said manifold and leads and a plastic insulating and dielectric compound about said conductors, said spark plug leads and manifold being open to each other so that said compound may pass therebetween.

10. In a radio-shielded ignition system, the combination with a radio-shielding manifold, of radio-shielding spark plug leads extending therefrom, conductors in said manifold and leads, a relatively rigid insulating support for the conductors, said insulating support being within and extending longitudinally of the manifold and means for spacing said support from the walls of said manifold.

11. In a radio-shielded ignition system, the combination with a radio-shielding manifold, of radio-shielding spark plug leads extending therefrom, conductors in said manifold and leads, a relatively rigid insulating support for the conductors, said insulating support being within and extending longitudinally of the manifold, means for spacing said support from the walls of said manifold and a plastic insulating and dielectric compound between said support and said walls.

12. In a radio-shielded ignition system, the combination with a radio-shielding manifold, of radio-shielding spark plug leads extending therefrom, conductors in said manifold and leads, a relatively rigid insulating support for the conductors, said insulating support being within and extending longitudinally of the manifold and means for spacing said support from the walls of said manifold, said support having laterally opening slots in which said conductors are laid.

13. In a radio-shielded ignition system, the combination with a radio-shielding manifold, of radio-shielding spark plug leads extending therefrom, conductors in said manifold and leads, a relatively rigid insulating support for the conductors, said insulating support being within and extending longitudinally of the manifold and means for spacing said support from the walls of said manifold, said support having laterally opening slots in which said conductors are laid and means closing said slots to hold the conductors therein.

14. In a radio-shielded ignition system, the combination with a radio-shielding manifold, of radio-shielding spark plug leads extending therefrom, conductors in said manifold and leads, a relatively rigid insulating support for the conductors, said insulating support being within and extending longitudinally of the manifold and means for spacing said support from the walls of said manifold, said support having laterally openings slots in which said conductors are laid, means for closing said slots to hold the conductors therein and spacing said support from the walls of said manifold.

15. In a radio-shielded ignition system, the combination with a radio-shielding manifold, of radio-shielding spark plug leads extending therefrom, conductors in said manifold and leads, a relatively rigid insulating support for the conductors, said insulating support being within and extending longitudinally of the manifold, the conductors leading to said spark plug leads extending laterally from said insulating support at a plurality of points intermediate its ends.

16. In a radio-sh'elded ignition system, the combination with a radio-shielding manifold, of a radio-shielded spark plug lead extending therefrom, a conductor in said lead and flexure-permitting, segmented, solid insulating means upon said conductor. the segments of said segmented means being c. .ciform in cross section.

17. A radio shielded ignition system comprising in combination; a radio-shielding manifold structure, radio-shielding spark plug lead structures extending therefrom, conductors contained in said manifold structure and in said lead structures, each of said lead structures comprising a radio-shielding conduit substantially fluid tight for the greater part of its length, said manifold structure and said lead structures providing intercommunicating spaces in which fluent material may flow in said manifold about its contained conductors and also in which fluent material may flow in each of said leads about its contained conductor, the said space in said manifold on the one hand and the said spaces in said leads on the other hand, being open to each other for the flow of fluent material therein, and inlet and outlet means adapted to allow the flow of fluent material from an external source into said intercommunicating spaces.

MELVILLE F. PETERS.
R. HARRY STONE.